United States Patent [19]

Oshimi et al.

[11] 4,395,848
[45] Aug. 2, 1983

[54] BILLET REVERSER

[75] Inventors: Tetsuro Oshimi, Nagoya; Shoji Kaneko, Chita, both of Japan

[73] Assignee: Noritake Co., Limited, Nagoya, Japan

[21] Appl. No.: 283,543

[22] Filed: Jul. 14, 1981

[30] Foreign Application Priority Data

Aug. 12, 1980 [JP] Japan .................................. 55-110774

[51] Int. Cl.³ ............................................. B24B 41/06
[52] U.S. Cl. .................... 51/217 R; 414/756
[58] Field of Search ................. 51/216 R, 217 R; 269/289 MR; 414/775, 756; 198/413

[56] References Cited

U.S. PATENT DOCUMENTS

| 3,018,591 | 1/1962 | Wrobbel | 51/217 R |
|---|---|---|---|
| 3,182,817 | 5/1965 | Figley | 414/775 |
| 3,217,899 | 11/1965 | Makowski | 414/756 |
| 3,269,564 | 8/1966 | Doherty | 414/756 |
| 4,103,883 | 8/1978 | Shepherd | 269/289 MR |

Primary Examiner—Harold D. Whitehead
Attorney, Agent, or Firm—Wenderoth, Lind & Ponack

[57] ABSTRACT

Chains are passed with a sagging round first sprockets incapable of movement and second and third sprockets capable of movement corresponding to the movement of the opposite free ends of a bellcrank rotatable in a vertical plane. The chains are moved to cause reversal of a billet supported by them. Also, the billet can be clamped by the same apparatus.

3 Claims, 8 Drawing Figures

BILLET REVERSER

BACKGROUND OF THE INVENTION

1. Field of the Invention

This invention relates to billet reversers of the type in which chains passed with a sagging are driven for reversing a billet.

2. Prior Art

Hitherto, the polishing of a billet has required a reverser for reversing the billet to upwardly direct a given surface thereof and a clamper for clamping the billet at the time of the polishing operation. Thus, the apparatus as a whole has been large in scale and complicated, and its operation has not been simple.

SUMMARY OF THE INVENTION

The invention seeks to provide a billet reverser, in which an arm and a rotary housing are mounted on a horizontal rotatable shaft such that they can be rotated in unison with each other, chains are passed with a predetermined sagging round first and second sprockets mounted in upper portions of a stationary housing and the rotary housing respectively and third sprockets mounted in an end portion of the arm, and stationary and movable pawls of a vice are mounted on top of the stationary and rotary housings respectively.

A first object of the invention is to simplify the construction of a billet reverser of the type in which a billet is reversed with the movement of chains passed with a sagging, by reducing the number of sprockets round which the chains are passed.

A second object of the invention is to permit both the reversal and clamping of a billet to be effected with the same apparatus.

The above and further objects, features and advantages of the invention will become more apparent from the following description.

BRIEF DESCRIPTION OF THE DRAWINGS

FIGS. 1 to 8 show one embodiment of the invention, in which;

FIG. 1 is a plan view showing a wheeled transporter carrying the billet reverser according to the invention;

FIG. 2 is a side view of the wheeled transporter carrying the billet reverser according to the invention;

FIG. 3 is a plan view of the billet reverser according to the invention;

FIG. 4 is a plan view of the billet reverser according to the invention;

FIG. 5 is a section taken along line V—V in FIG. 3;

FIG. 6 is a section taken along line VI—VI in FIG. 3;

FIG. 7 is a section taken along line VII—VII in FIG. 3; and

FIG. 8 is a section taken along line VIII—VIII in FIG. 3.

DETAILED DESCRIPTION OF THE INVENTION

An embodiment of the invention is shown in FIGS. 1 to 8.

Figure 1:
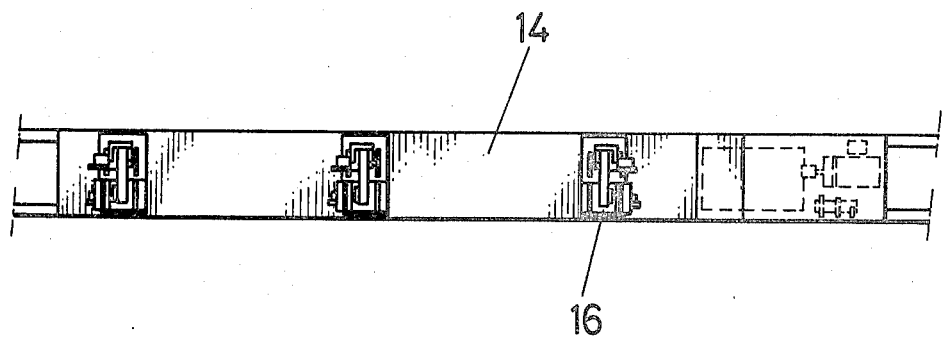
Figure 2:
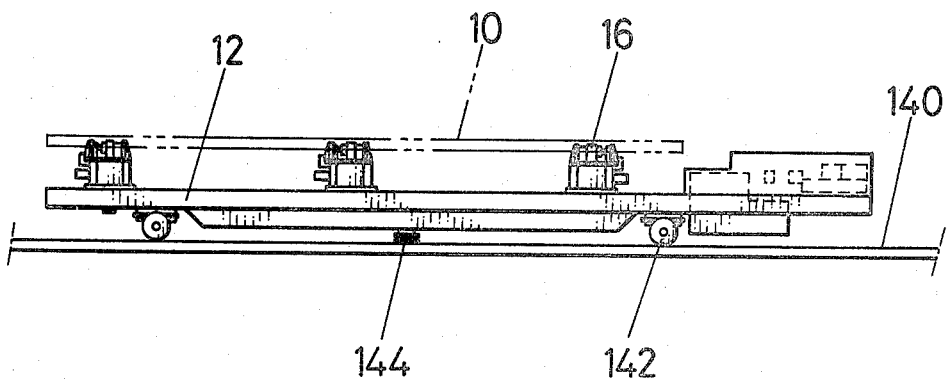

As shown in FIGS. 1 and 2, a wheeled transporter 12 has a table 14, on which several billet reversers 16 for reversing a billet 10 to be described later are mounted at a predetermined interval.

The billet reverser 16 will now be described with reference to FIGS. 3 to 8. The table 14 on the wheeled transporter 12 has openings 18 formed at a predetermined interval for inserting therethrough an arm 54 and a lever 66 to be described later. A stationary housing 20 is secured to the table 14 via a washer 22 to stride one of the openings 18. A pair of brackets 24 are secured to the table 14 in the longitudinal direction of the table 14 on the opposite sides of the opening 18 such that they face the stationary housing 20. A support plate 26 which is mounted on top of the stationary housing 14 has an opening 28 formed substantially in its central portion for passing chains 48 and 114 to be described later. A pair of brackets 30 are secured to the table on the opposite sides of the opening 28 such that they are parallel to the aforementioned pair brackets 24.

Stationary pawls 32 of a vice are secured to the outer sides of the pair brackets 30.

A first sprocket shaft 36 carrying first four ganged sprockets 34 fitted on it is rotatably supported in the pair brackets 30 via bearings 38, and a first oil hydraulic motor 42 which is a reversible motor is mounted on one side wall of the stationary housing 20. A chain 48 is passed round a sprocket 46 fitted on a drive shaft 44 of the first oil hydraulic motor 42 and one of the aforementioned first ganged sprockets 34, so that the first ganged sprockets 34 are rotated by the first oil hydraulic motor 42.

A rotatable shaft 52 is mounted horizontally and rotatably in the aforementioned pair brackets 24 via bearings 50.

The arm mentioned above carries a box-like housing 56 mounted at its front end and a bifurcated connecting member 58 mounted at the rear end. Further, it is provided with an insertion hole 60 formed in its portion slightly on the rear end side of its center. The rotatable shaft 52 is rotatably inserted through the insertion hole of the arm 54 via a bush 62, and the arm 54 is rotatable about the rotatable shaft 52.

A pair of hollow cylindrical members 64 are fitted on the rotatable shaft 52 on the opposite sides of the arm 54 such that they are not rotatable relative to the shaft 52. The levers 66 and a rotary housing 68 are respectively secured to the respective hollow cylindrical members 64 such that the former is substantially downwardly and the latter is upwardly directed therefrom. The lever 66 and the rotary housing 68 are rotatable in unison with the shaft 52.

A second sprocket shaft 72 is non-rotatably mounted on the upper portion of the opposite side walls 70 of the rotary housing 68 such that it is parallel to and substantially at the same level as the first sprocket shaft 36, and second four ganged sprockets 74 are rotatably mounted on the second sprocket shaft 72 via a bush 76.

A second reversible oil hydraulic motor 78 is mounted on the side wall 70 of the rotary housing 68, and its drive shaft 80 carries a sprocket 82 fitter thereon. A chain 84 is passed round the sprocket 82 and one of the second four ganged sprockets 74, which are thus rotated by the second oil hydraulic motor 78.

Movable pawls 86 of a vice are mounted on top of the respective opposite side walls 70 of the rotary housing 68 such that they are substantially at the same level.

Figure 3:
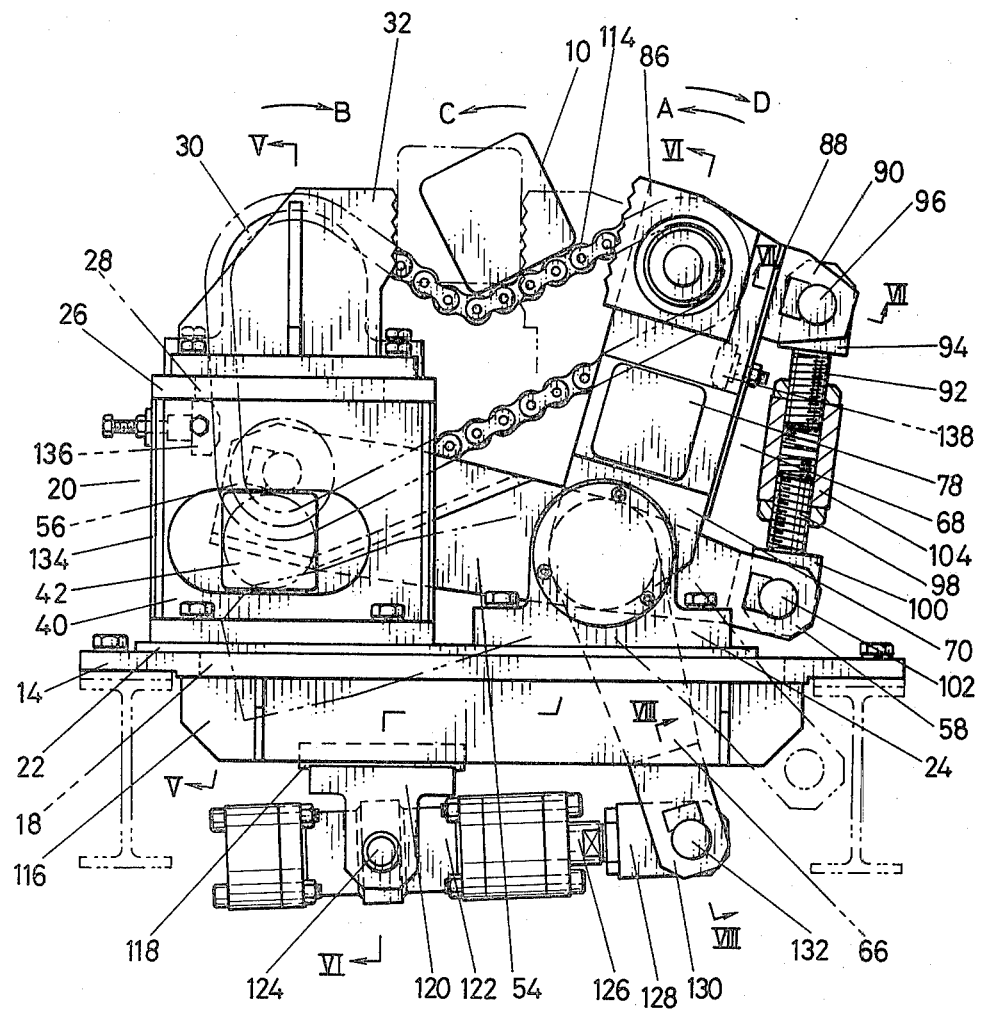
Figure 4:
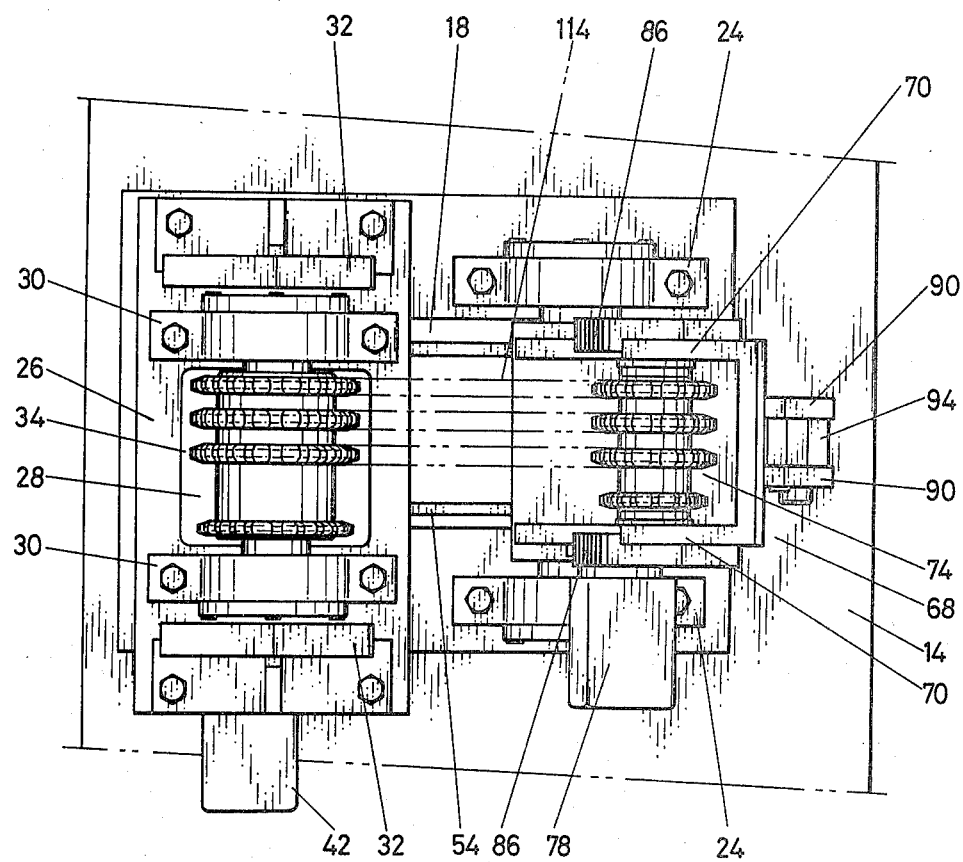
Figure 5:
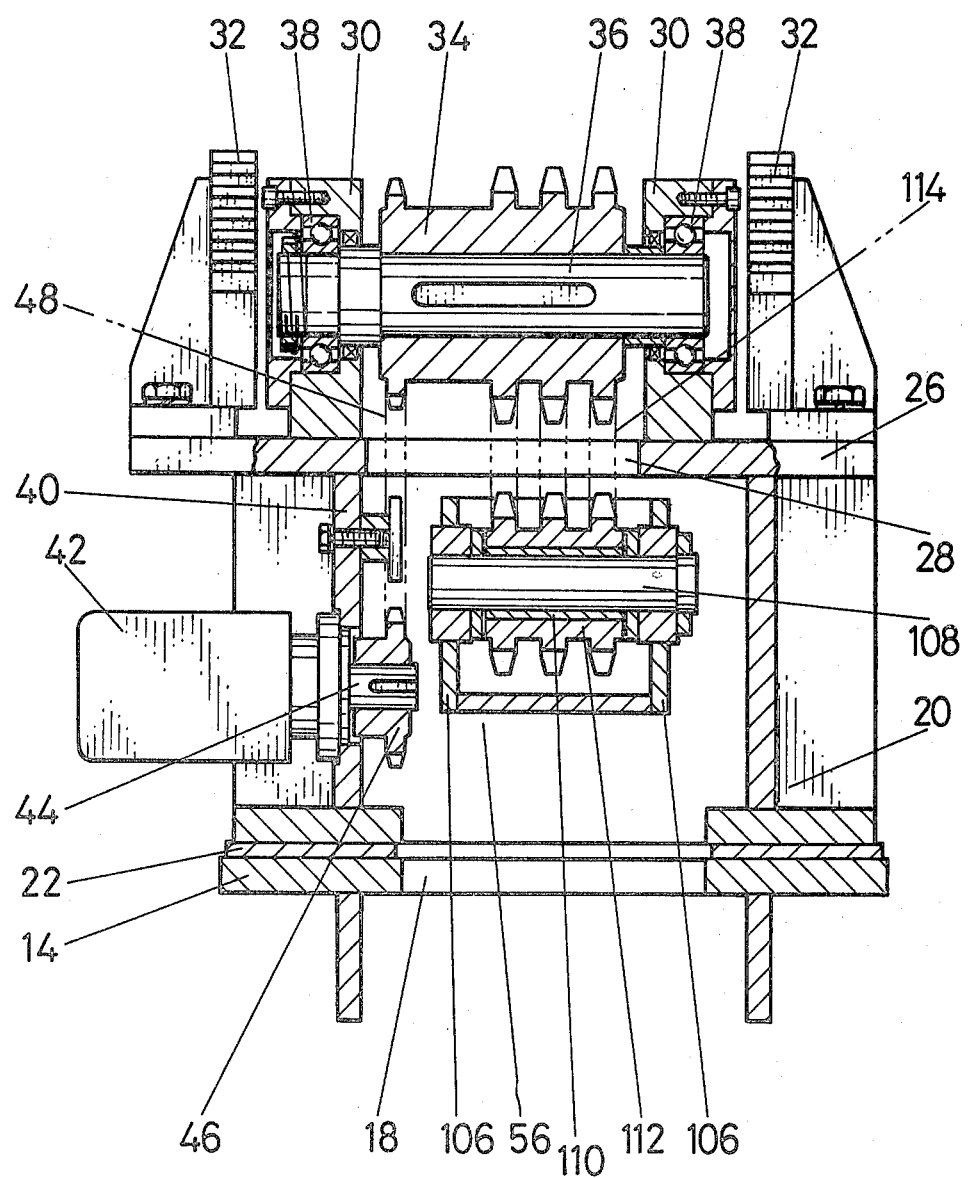
Figure 7:
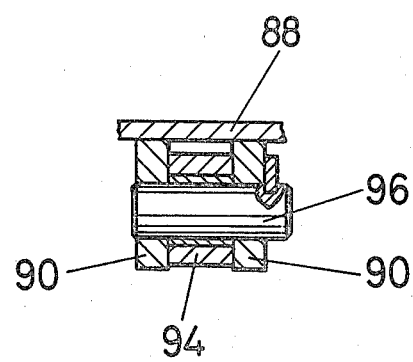

In FIGS. 3 and 7, the rotary housing 68 has a connection wall 88 carrying a pair of brackets 90 secured thereto, and a bolt 92 has its plate-like head 94 found between and pivoted to the pair brackets 90 by a pin 96. A bolt 98 having a thread opposite in direction to that of the aforementioned bolt 92 has its plate-like head 100 found between and pivoted to the aforementioned bifurcated connecting member 58 extending from the rear end of the arm 54 by a pin 102. The bolts 92 and 98 are coupled together by a sleeve nut 104, and by operating an oil hydraulic cylinder 122 to be described later the arm 54 and rotary housing 68 are rotated in unison with each other like a bellcrank about the horizontal shaft 52 by the lever 66. The positional relation of the arm 54 and rotary housing 78 to each other can be slightly varied by turning the sleeve nut 104 for varying the sag of chains 114 to be described later.

A third sprocket shaft 108 is non-rotatably mounted in the opposite side walls 106 of the box-like housing 56 mounted on the arm 54 at the front end thereof such that it extends parallel to the first sprocket shaft 36, and third three ganged sprockets 112 are rotatably mounted on the third sprocket shaft 108 via a bush 110, and three chains 114 are passed round the respective third sprockets 112, first sprockets 34 and second sprockets 74 with a predetermined sag provided.

Figure 6:
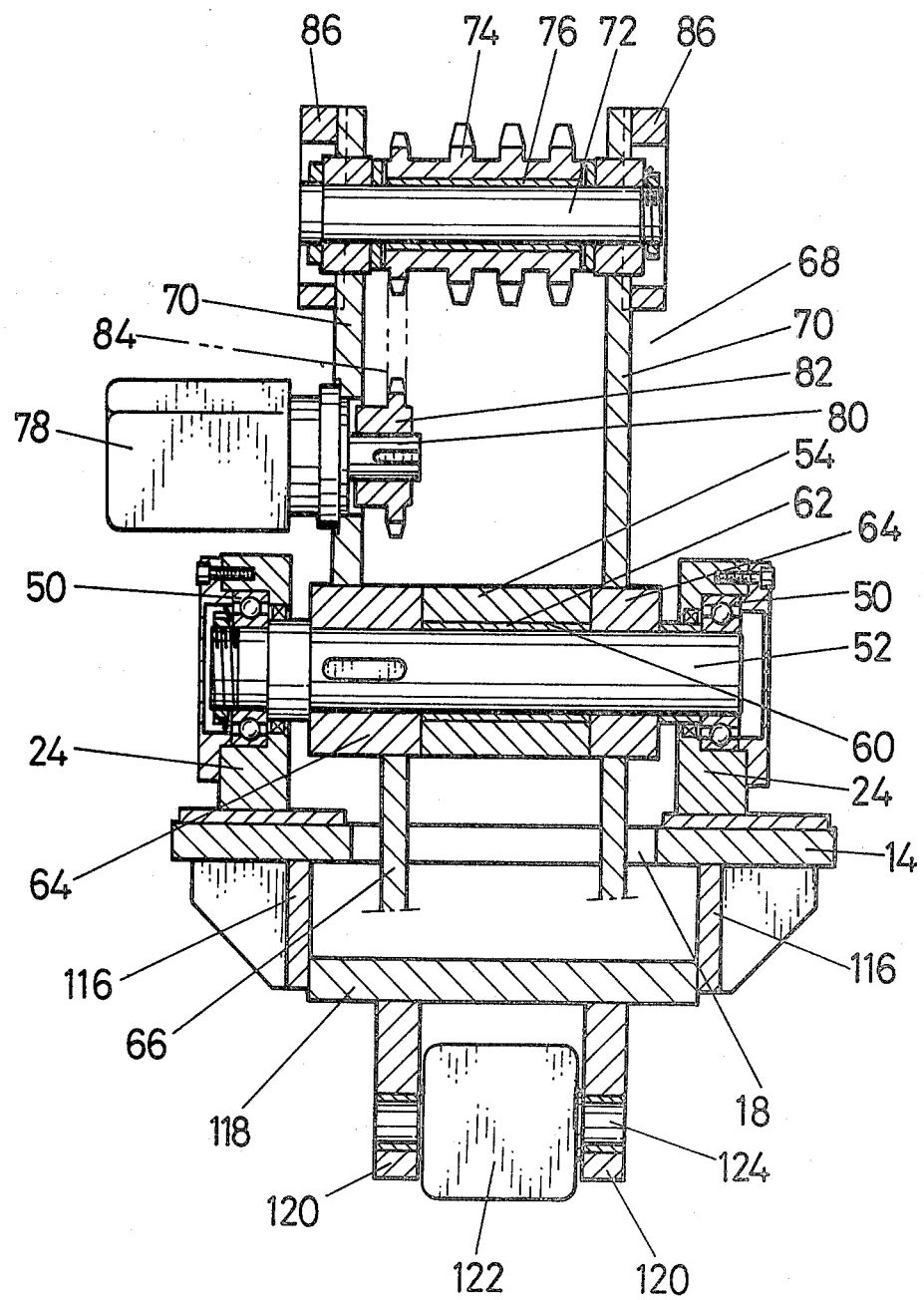
Figure 8:
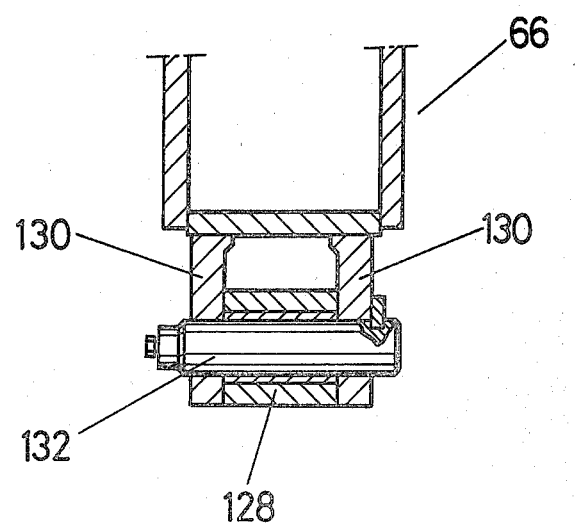

In FIGS. 3, 6 and 8, a pair of plates 116 vertically depend from the table 14 of the wheeled transporter 12 along the longitudinal opposite sides of the opening 18. A horizontal plate 118 is mounted on the lower end of a central portion of the pair plates 116, and it carries a pair of brackets 120 depending from it. A central portion of an oil hydraulic cylinder 122 is found between and pivoted by pins 124 to the pair brackets 120.

The oil hydraulic cylinder 122 has a rod 126 which is provided with a knuckle 128 coupled to its end. The knuckle 128 is found between and pivoted by a knuckle pin 132 to a pair of connection members 130 extending from the end of the lever 66. Thus, with the advancement and retreat of the rod 126 of the oil hydraulic cylinder 122, the arm and rotary housing 68 are rotated about the shaft 52 by the lever 66.

In FIG. 3, a connection wall 134 of the stationary housing 20 and the connection wall 88 of the rotary housing 68 are provided with respective tensioning members 136 and 138 capable of being advanced and retreated for adjusting tension in the chains 48 and 84.

In FIGS. 1 and 2, designated at 140 are rails supporting the wheels 142 of the wheeled transporter 12, and at 144 pulleys round which a wire rope for reciprocating the wheeled transporter 12 is passed.

Now, the operation of the embodiment of the invention will be described with reference to FIGS. 3 to 6.

By causing the retreat of the rod 126 of the oil hydraulic cylinder 122 to the position as shown by solid lines in FIG. 3, the arm 54 and rotary housing 68 are rotated in the clockwise direction via the lever 66. In this way, a sufficient space is provided between the stationary pawls 32 and movable pawls 86 of the vice for throwing the billet 10.

At this time, the first sprockets 34 are held stationary by holding the first oil dydraulic motor 42 stationary so that the sag of the chains 114 may be confined between the first and second sprockets 34 and 74, while at the same time the second oil hydraulic motor 78 is always given a light oil hydraulic pressure so that the second sprockets 74 may be rotated in the direction of arrow A in FIG. 3.

In this state, by charging the billet 10 into between the stationary and movable pawls 32 and 86 of the vice to be received by the chains 114, the oil hydraulic pressure of the second oil hydraulic motor 78 and the weight of the billet 10 confine the sag of the chains 114 to be between the first and second sprockets 34 and 74.

Then, the first oil hydraulic motor 42 is started to cause rotation of the first sprockets 34 in the direction of arrow B while holding the second oil hydraulic motor 74 free to rotate for moving the chains 114. As a result, the billet 10 is turned in the direction of arrow C with its lower side urged in that direction by the portion of the sagging chains 114 between the first and second sprockets 34 and 74. When a given surface of the billet 10 is directed upwards, the first oil hydraulic motor 42 is stopped to stop the chains 114.

Then, with the first sprockets 34 held stationary by holding the first oil hydraulic motor 42 stationary, the rod 126 of the oil hydraulic cylinder 122 is gradually advanced while continually providing the oil hydraulic pressure to the second oil hydraulic motor 78. As a result, the arm 54 and rotary housing 68 are gradually rotated in the counterclockwise direction with the rotation of the lever 66, and the chains 114 between the first and second sprockets 34 and 74 are pulled, and eventually the opposite sides of the billet 10 supported by the chains 114 are firmly clamped between the stationary and movable pawls 32 and 86 of the vice as shown in a dot and a bar line of FIG. 3.

In this state, the wheeled transporter 12 is moved for effecting necessary polishing operation on the top surface of the billet 10.

After the necessary polishing operation is made on the billet 10, the first and second oil hydraulic motors 42 and 78 are made free to rotate, and the rod 126 of the oil hydraulic cylinder 122 is gradually retracted to cause gradual clockwise rotation of the arm 54 and rotary housing 68. As a result, the billet 10 is released from its clamped state while the chains 114 are allowed to sag between the first and second sprockets 34 and 74. Thus, the same state as that at the time of charging of the billet 10 is obtained again, and in this state, the billet 10 is taken out from the reverser 16 by suitable means.

While in the above embodiment the reversal of the billet 10 has been effected by moving the chains 114 in the clockwise direction, depending upon the position of the polishing surface of the billet 10 reversal thereof may be made in the counterclockwise direction.

Further, the adjustment of the extent of sagging of the chains 114 is effected through slight variation of the positional relation between the arm 54 and rotary housing 68 caused by turning the sleeve nut 104.

As has been shown, with the construction and operation of the billet reverser according to the invention, the reversal and clamping of elongate billets which are quite inconvenient to handle can be made with the same apparatus of a simple construction, thus permitting the operation of polishing the billet at an increased efficiency.

Further, the extent of sagging of the chains 114 can be adjusted by varying the positional relation between the arm 54 and rotary housing 68 by rotating the sleeve nut 104, and thus it is possible to obtain the reversal and clamping of billets of various sectional profiles and sizes very convenient.

What is claimed is:
1. A billet reverser comprising a table mounted on a wheeled transporter, a pair of brackets secured to said table, a rotatable shaft horizontally supported by said brackets, an arm substantially horizontally mounted on said rotatable shaft, a rotary housing extending substantially vertically and mounted on said rotatable shaft such that said arm and rotary housing can be rotated about said rotatable shaft in unison with each other like a bellcrank, a stationary housing secured to said table and facing said rotary housing, a first sprocket shaft mounted in an upper portion of said stationary housing and extending parallel to said rotatable shaft, a second sprocket shaft mounted in an upper portion of said rotary housing, a third sprocket shaft mounted in an end portion of said arm, first second and third sprockets fitted on said respective first, second and third sprocket shafts, chain means passed round said first, second and third sprockets with a predetermined sagging, a first reversible oil hydraulic motor coupled to said first sprocket, and a second reversible oil hydraulic motor coupled to said second sprocket, said first and second reversible oil hydraulic motors being coupled to each other by said chain means.

2. The billet reverser according to claim 1, which further comprises a vice including stationary pawl mounted on said stationary housing and a movable pawl mounted on said rotary housing and substantially at the same level as said stationary pawl.

3. The billet reverser according to claims 1 or 2, wherein said rotary housing is mounted on said rotatable shaft such that it is not rotatable with respect thereto, while said arm is rotatably mounted on said rotatable shaft, the rear end of said arm and the upper end of said rotary housing being coupled to each other such that the angle between said arm and rotary housing is adjustable.

* * * * *